United States Patent
Laurösch et al.

(10) Patent No.: US 6,957,170 B2
(45) Date of Patent: Oct. 18, 2005

(54) SWITCHGEAR CABINET OR SWITCHGEAR CABINET ASSEMBLY COMPRISING A MONITORING DEVICE THAT IS ARRANGED THEREIN

(75) Inventors: Sven Laurösch, Haiger (DE); Jörg Kreiling, Biebertal (DE); Ralf Dahmer, Olpe (DE)

(73) Assignee: Rittal GmbH & Co. KG, Herborn (DE)

(*) Notice: Subject to any disclaimer, the term of this patent is extended or adjusted under 35 U.S.C. 154(b) by 141 days.

(21) Appl. No.: 10/433,319

(22) PCT Filed: Mar. 14, 2002

(86) PCT No.: PCT/EP02/02834

§ 371 (c)(1),
(2), (4) Date: Jun. 2, 2003

(87) PCT Pub. No.: WO02/075468

PCT Pub. Date: Sep. 26, 2002

(65) Prior Publication Data

US 2004/0153779 A1 Aug. 5, 2004

(30) Foreign Application Priority Data

Mar. 20, 2001 (DE) .......................................... 101 13 626

(51) Int. Cl.$^7$ .......................... G06F 11/30; G06F 11/00; H05K 7/20
(52) U.S. Cl. ...................... 702/184; 702/188; 340/540; 340/3.1; 361/605; 361/695
(58) Field of Search .......................... 702/58–62, 122, 702/182–185, 188; 324/415, 424; 340/500, 540, 3.1, 3.42–3.44, 3.7–3.9; 361/62, 71, 115, 103, 106, 605, 679, 695, 696; 700/9, 21, 292, 293, 297, 299

(56) References Cited

U.S. PATENT DOCUMENTS

| | | | | |
|---|---|---|---|---|
| 5,859,596 A | * | 1/1999 | McRae | 340/870.02 |
| 5,930,736 A | | 7/1999 | Miller et al. | 702/127 |
| 6,032,203 A | * | 2/2000 | Heidhues | 710/11 |
| 6,163,854 A | * | 12/2000 | Hain et al. | 714/4 |
| 6,222,448 B1 | * | 4/2001 | Beck et al. | 340/506 |
| 6,346,882 B1 | * | 2/2002 | Hain et al. | 340/521 |
| 6,348,745 B1 | * | 2/2002 | Laurosch et al. | 307/112 |

FOREIGN PATENT DOCUMENTS

| | | | |
|---|---|---|---|
| DE | 19609689 A1 * | 9/1997 | F24F/11/02 |
| DE | 196 15 469 A1 | 10/1997 | |
| DE | 199 11 249 A1 | 9/2000 | |
| DE | 199 11 318 A1 | 9/2000 | |
| DE | 199 11 824 A1 | 10/2000 | |
| EP | 0 864 950 A1 | 2/1998 | |
| WO | WO 97/34345 | 9/1997 | |

* cited by examiner

Primary Examiner—Marc S. Hoff
Assistant Examiner—Manuel L Barbee
(74) Attorney, Agent, or Firm—Pauley Petersen & Erickson

(57) ABSTRACT

A switchgear cabinet or a switchgear cabinet assembly having at least one monitoring device arranged therein for monitoring switchgear cabinet functions, including temperature regulation. This invention provides extended control options for the safety of the switchgear cabinet, while maintaining its ease of use. To achieve this, the monitoring device is connected by a link to a monitoring module of a computational unit, which is responsible for external functions and is housed in the switchgear cabinet or assembly, and is configured for evaluating signals received from the monitoring module.

12 Claims, 1 Drawing Sheet

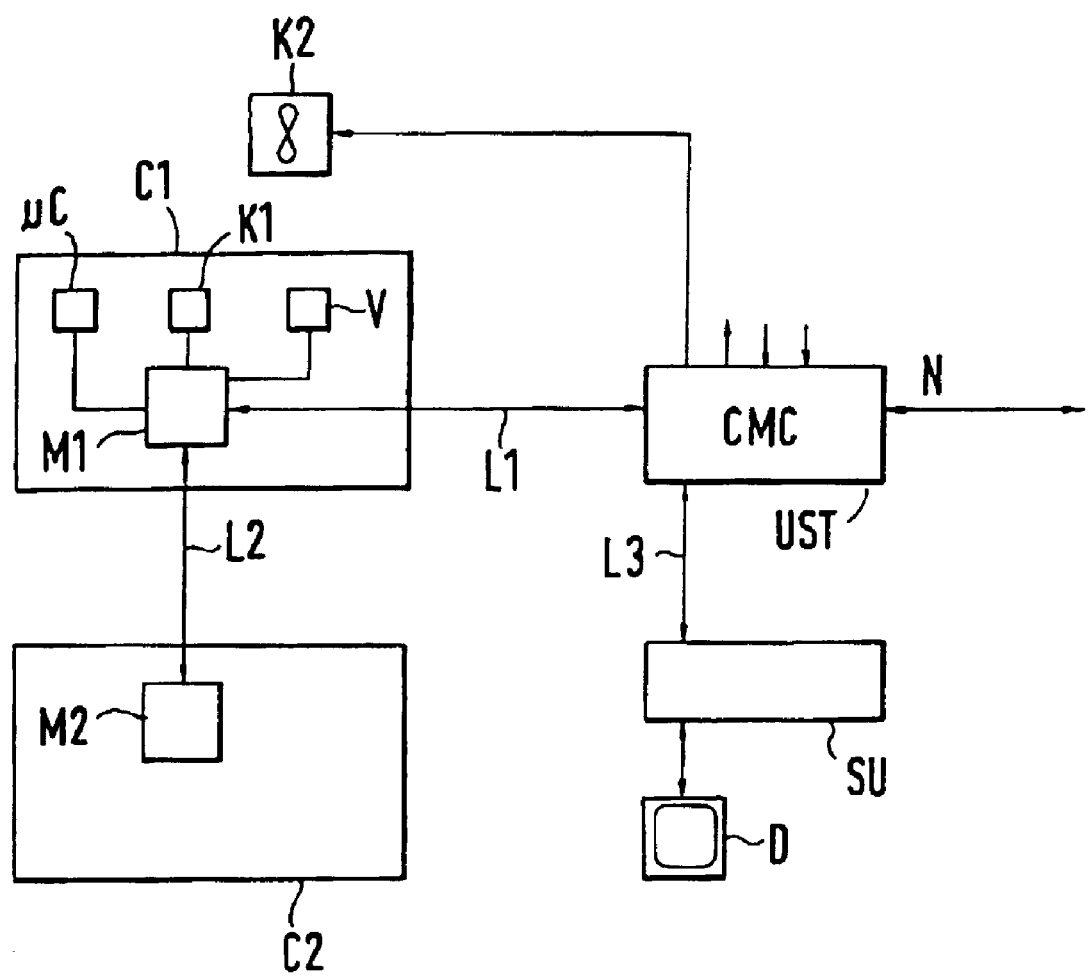

SWITCHGEAR CABINET OR SWITCHGEAR CABINET ASSEMBLY COMPRISING A MONITORING DEVICE THAT IS ARRANGED THEREIN

BACKGROUND OF THE INVENTION

1. Field of the Invention

This invention relates to a switchgear cabinet or a switchgear cabinet arrangement having at least one monitoring device for switchgear cabinet functions, including temperature regulation, arranged therein.

2. Discussion of Related Art

A switchgear cabinet with a monitoring device which assumes control functions is disclosed by PCT International Publication WO 97/34345. In this known switchgear cabinet, various sensors, for example temperature sensors, vibration sensors, smoke detectors, humidity sensors, voltage sensors, door limit stop switches, and the like, as well as actuators and data transmission connections with external operating devices, are connected via input and output interfaces to a central control device with a processor or microcontroller provided therein. Various components, such as a cooling device, exhaust fan or heater with appropriate control and regulating components can be provided for temperature regulation.

SUMMARY OF THE INVENTION

One object of this invention is to provide a switchgear cabinet or a switchgear cabinet arrangement of the type mentioned above, but which offers a user increased monitoring or control options, along with simple operation, wherein the cost is kept as low as possible.

This object is attained with this invention having characteristics described in the claims and in this specification. The monitoring device is connected via a connection to a monitoring module of a computer unit housed in the switchgear cabinet or the switchgear cabinet arrangement, which is responsible for external functions and is designed for the evaluation of signals received from the monitoring module. With these measures, when the switchgear cabinet is used for the installation of computer units, for example servers or the like, the user has an additional option of monitoring with the monitoring device assigned to the switchgear cabinet functions. Then the switchgear cabinet can be adapted to various conditions of employment, and the computer units contained therein can be adapted to the conditions of their physical surroundings and, if necessary, to affect these by suitable control means.

In one advantageous embodiment, the monitoring module is designed at least for monitoring the proper functioning of a microcontroller, an electrical power supply and/or a cooling unit of the computer unit, and for issuing connected signals. The monitoring device is designed for processing the signals received and for passing them on to a network interface for interrogating the received signals via a network. For example, it is possible to monitor the unauthorized opening of the computer housing using the monitoring module of the computer unit, and appropriate data can be passed on to the monitoring device for evaluation. The monitoring device offers a control device, which is or can be integrated into the switchgear cabinet or the switchgear cabinet arrangement, by which all monitoring tasks regarding the switchgear cabinet are handled centrally and uniformly. For example, additional displays and associated control devices for monitoring the computer units are not necessary.

If the monitoring device is connected by the network with a remote control station, by which the switchgear cabinet functions and the functions of the computer unit monitored by the monitoring module can be controlled and suitable responses can be performed by actuators, which can be accessed via the monitoring device, it is possible, for example in case of a remote placement in other rooms or buildings, or on an exterior wall, to perform monitoring. If necessary, actions can be taken for the dependable operation of the computer units from the remote central control station, in an easy to watch manner, wherein different data paths, for example selectable connections or suitable networks, such as local networks, ether net or internet, can be employed.

The monitoring device contributes to the increase of the operational dependability of the computer units because when detecting a malfunction of the electrical power supply for the computer unit, or of its cooling unit, by the monitoring device, an auxiliary electrical power supply provided in the switchgear cabinet and assigned or assignable to the computer unit is switched on, or an auxiliary cooling unit is switched on, or the computer unit is entirely or partially switched off.

For the display and configuration of the monitoring device it is connected by a connection with a server switching device housed in the switchgear cabinet arrangement. By way of the switching device with the display control device it is possible to add to the uniformity, user-friendly operability and the simplest design possible.

With a simple structure, the monitoring options and the control options connected therewith are further expanded with a simple system design because the monitoring module is brought into a data exchange connection with at least one further monitoring module of a further computing unit via a further connection, and also passes on data received from the latter to the monitoring device. Thus, it is possible with a simple arrangement to monitor the physical operating conditions of several computer units with one monitoring device.

The simple design is further enhanced because the connection between the monitoring module and the monitoring device and/or the further connection between the monitoring module and the further monitoring module each is designed as a bus connector. A linkage of the different components for monitoring and possibly controlling the air conditioning, the microprocessor system and/or the electrical power supply of the computer unit (EN) can be performed by common bus systems, such as I²C, CAN, LON, IPMI, RS232 buses or the internet.

The data from the computer unit (EN) important for monitoring can also be picked up by the monitoring device when the operating systems of the server do not react or are even shut down.

BRIEF DESCRIPTION OF THE DRAWING

This invention is explained in greater detail in view of an exemplary embodiment and by making reference to the drawing.

DESCRIPTION OF PREFERRED EMBODIMENTS

Server cabinets or similar electronic cabinets, for example, are considered to be switchgear cabinets.

In a block diagram, the drawing shows a switchgear cabinet monitoring device UST, provided in a switchgear cabinet or a switchgear cabinet arrangement, which is connected via a connection L1, preferably a bus connection, with a monitoring module M1 of a computer unit C1. The monitoring module M1 is a monitoring module which is provided in such a unit, for example a CPU or compact PCI, network element, server, which offers several software interfaces with the hardware of the computer unit C1, and which also has a connector used for connecting the monitoring device UST via the connection L1. Various physical system parameters, such as temperature, supply voltages V, cooling unit K1, in particular in the form of exhaust fans, network elements and detector signals regarding the unauthorized opening of the computer housing, as well as data stored in this connection, can be monitored by the monitoring module M1. Preferably, the monitoring module M1 is operated with its own electrical power supply and is therefore independent of the supply of the computer unit C1 system. In addition, it can have a number of A/D interfaces, with the aid of which it monitors the entire electrical power supply of the computer unit C1. Data can be exchanged with a further monitoring M2 of a further computer unit C2 via a further connection L2, in particular a bus connection. Correspondingly, still further monitoring modules can be connected via the further monitoring module M2.

The monitoring device UST, which preferably performs all monitoring and control functions relating to the switchgear cabinet, as explained in detail in PCT International Publication WO 97/34345, by which appropriate parameters for various employment conditions can be preset, has additional functions exceeding the mere monitoring of the switchgear cabinet because of the connection of the monitoring module M1 and possibly further than that, of the further monitoring module M2. It is possible to also include the monitoring of the physical status of the computer units C1, C2 installed in the switchgear cabinet, or the switchgear cabinet arrangement, and to exert an influence on them, when required. By integrating the monitoring of the computer units C1, C2 into the monitoring device UST, the user is offered a uniform total monitoring by a simple, clear operation.

The data processed by the monitoring device UST can be uniformly transmitted via a network connection N to a remote control station and displayed there, so that an operator has simple control possibilities regarding the switchgear cabinet functions, as well as the physical state of the computer units C1, C2 and can, if necessary, exert an appropriate influence on the control functions of the monitoring device UST. For example, if a cooling unit K1, or an exhaust fan of the computer unit C1 fails, a further cooling unit K2 in the form of an exhaust fan or the like, which is provided anyway in the switchgear cabinet, or can be provided there, can be switched on as a replacement for cooling the computer unit C1. In case of failure of the power supply V, the affected computer unit C1 can be connected to an auxiliary power supply provided in the switchgear cabinet. The switch-off of the computing unit C1 by the monitoring device UST is also possible.

The monitoring device UST is connected via a connector L3 with a server switching device SU, and via the server switching device SU with a display control device D, in particular a so-called on-screen display. Because of the display control device D, which is customarily assigned to the server switching device SU, it is no longer necessary to equip the monitoring device UST itself with an elaborate display unit and an appropriate control device. The monitoring device UST can be configured simply and clearly and with appropriate hardware and software of the server switching device SU, or of the display control device, so that it is capable to set, for example, predetermined values for actuating, as well as sensor signals and parameters for triggering actuators, and to display data for their control.

With the described measures in connection with the monitoring device UST, it is possible to improve the ability of switchgear cabinets to function.

What is claimed is:

1. In a switchgear cabinet or a switchgear cabinet arrangement having at least one monitoring device for switchgear cabinet functions, with temperature regulation arranged therein, the improvement comprising:

the monitoring device (UST) connected via a connection (L1) to a monitoring module (M1) of a computer unit (C1) of an end-user and housed in the switchgear cabinet or the switchgear cabinet arrangement, wherein the monitoring device (UST) is responsible for functions of the switchgear cabinet or the switchgear cabinet arrangement and evaluates signals received from the monitoring module (M1) of the computer unit (C1).

2. In the switchgear cabinet or the switchgear cabinet arrangement in accordance with claim 1, wherein the monitoring module (M1) at least monitors proper functioning of at least one of a processor ($\mu$C) of the computer unit (C1), an electrical power supply (V) of the computer unit (C1) and a cooling unit (K1) of the computer unit (C1), and issues connected signals, and the monitoring device (UST) processes the signals received and passes the signals on to a network interface for interrogating the received signals via a network.

3. In the switchgear cabinet or the switchgear cabinet arrangement in accordance with claim 2, wherein the monitoring device (UST) is connected by a network (N) with a remote control station, by which switchgear cabinet functions and functions of the computer unit (C1) monitored by the monitoring module (M1) are controlled and suitable responses are performed by actuators which can be accessed via the monitoring device.

4. In the switchgear cabinet or the switchgear cabinet arrangement in accordance with claim 3, wherein when detecting a malfunction for one of the electrical power supply (V) for the computer unit (C1) and a cooling unit (K1), by the monitoring device, one of an auxiliary electrical power supply in the switchgear cabinet which is assigned to the computer unit (C1) is switched on, an auxiliary cooling unit (K2) is switched on, and the computer unit (C1) is at least partially switched off.

5. In the switchgear cabinet or the switchgear cabinet arrangement in accordance with claim 4, wherein, for display and configuration of the monitoring device (UST), the monitoring device (UST) is connected by a connection (L3) with a server switching device (SU) housed in the switchgear cabinet arrangement, and via the switching device with a display control device (D).

6. In the switchgear cabinet or the switchgear cabinet arrangement in accordance with claim 5, wherein the monitoring module (M1) is brought into a data exchange connection with at least one further monitoring module (M2) of a further computer unit (C2) via a further connection (L2) and passes on received data to the monitoring device (UST).

7. In the switchgear cabinet or the switchgear cabinet arrangement in accordance with claim 6, wherein at least one of the connection (L1) between the monitoring module (M1) and the monitoring device (UST) and the further connection (L2) between the monitoring module (M1) and the further monitoring module (M2) is each designed as a bus connector.

8. In the switchgear cabinet or the switchgear cabinet arrangement in accordance with claim 1, wherein the monitoring device (UST) is connected by a network (N) with a remote control station, by which switchgear cabinet functions and functions of the computer unit (C1) monitored by the monitoring module (M1) are controlled and suitable responses are performed by actuators which can be accessed via the monitoring device.

9. In the switchgear cabinet or the switchgear cabinet arrangement in accordance with claim 1, wherein when detecting a malfunction for one of the electrical power supply (V) for the computer unit (C1) and a cooling unit (K1), by the monitoring device, one of an auxiliary electrical power supply in the switchgear cabinet which is assigned to the computer unit (C1) is switched on, an auxiliary cooling unit (K2) is switched on, and the computer unit (C1) is at least partially switched off.

10. In the switchgear cabinet or the switchgear cabinet arrangement in accordance with claim 1, wherein, for display and configuration of the monitoring device (UST), the monitoring device (UST) is connected by a connection (L3) with a server switching device (SU) housed in the switchgear cabinet arrangement, and via the switching device with a display control device (D).

11. In the switchgear cabinet or the switchgear cabinet arrangement in accordance with claim 1, wherein the monitoring module (M1) is brought into a data exchange connection with at least one further monitoring module (M2) of a further computer unit (C2) via a further connection (L2) and passes on received data to the monitoring device (UST).

12. In the switchgear cabinet or the switchgear cabinet arrangement in accordance with claim 11, wherein at least one of the connection (L1) between the monitoring module (M1) and the monitoring device (UST) and the further connection (L2) between the monitoring module (M1) and the further monitoring module (M2) is each designed as a bus connector.

* * * * *